No. 706,362. Patented Aug. 5, 1902.
D. H. THURSTON & J. F. HOLDEN.
GRAIN PACKER FOR HARVESTING BINDERS.
(Application filed Feb. 13, 1901.)

(No Model.) 2 Sheets—Sheet 1.

Witnesses
Edwin McKee
B. P. Funk

Inventors
D. H. Thurston
J. F. Holden
Victor J. Evans Attorney

THE NORRIS PETERS CO., PHOTO-LITHO., WASHINGTON, D. C.

No. 706,362. Patented Aug. 5, 1902.
D. H. THURSTON & J. F. HOLDEN.
GRAIN PACKER FOR HARVESTING BINDERS.
(Application filed Feb. 13, 1901.)

(No Model.) 2 Sheets—Sheet 2.

Witnesses
Edwin G. McKee
B. P. Funk

Inventors
D. H. Thurston
J. F. Holden
By Victor J. Evans
Attorney

THE NORRIS PETERS CO., PHOTO-LITHO., WASHINGTON, D. C.

the combination with the binder-deck having
UNITED STATES PATENT OFFICE.

DANIEL H. THURSTON AND JOHN F. HOLDEN, OF PLYMOUTH, IOWA.

GRAIN-PACKER FOR HARVESTING-BINDERS.

SPECIFICATION forming part of Letters Patent No. 706,362, dated August 5, 1902.

Application filed February 13, 1901. Serial No. 47,179. (No model.)

*To all whom it may concern:*

Be it known that we, DANIEL H. THURSTON and JOHN F. HOLDEN, citizens of the United States, residing at Plymouth, in the county of Cerro Gordo and State of Iowa, have invented new and useful Grain-Packers for Harvesting-Binders, of which the following is a specification.

Our invention relates to improvements in harvesting-binders; and the objects of our improvements are, first, to provide grain-packers that will pack both ends of the bundle of grain at the same time; second, to produce a mechanism that will throw the packers out of operation while the needle is binding a bundle, thus preventing the accumulation of grain back of the needle while the latter is up. We attain these objects by the mechanism illustrated in the accompanying drawings, in which—

Figure 1:
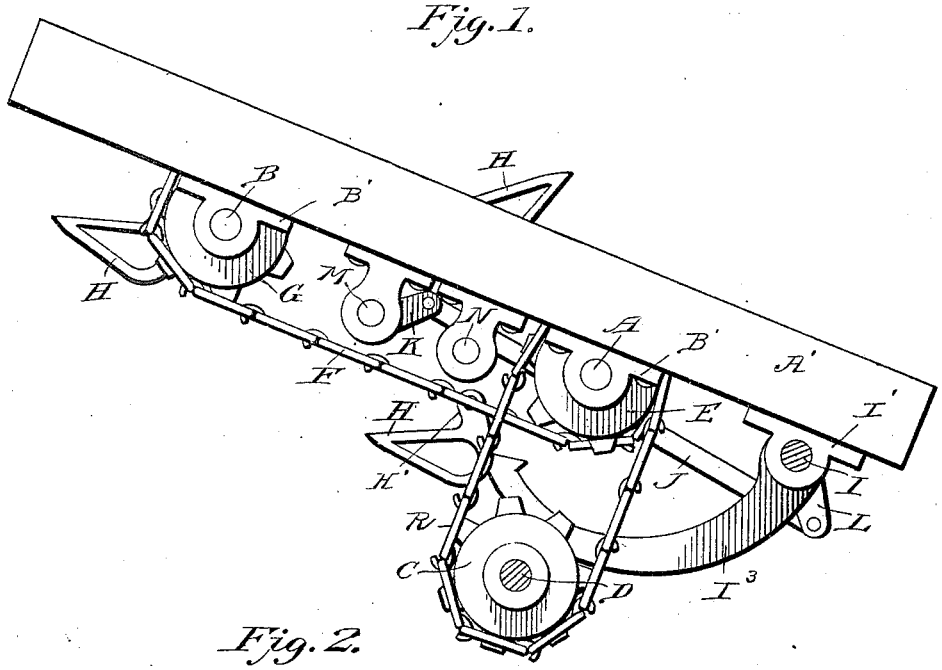
Figure 2:
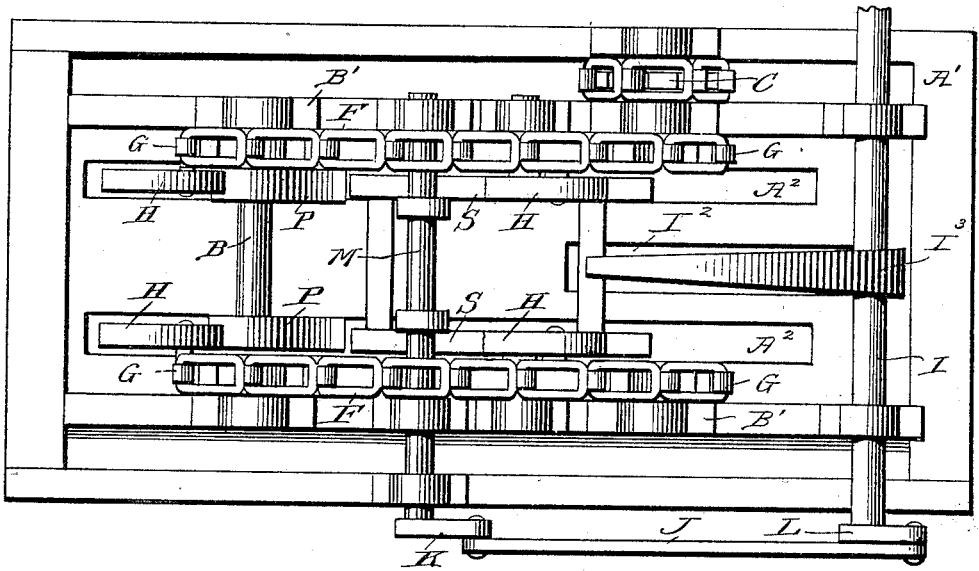
Figure 3:
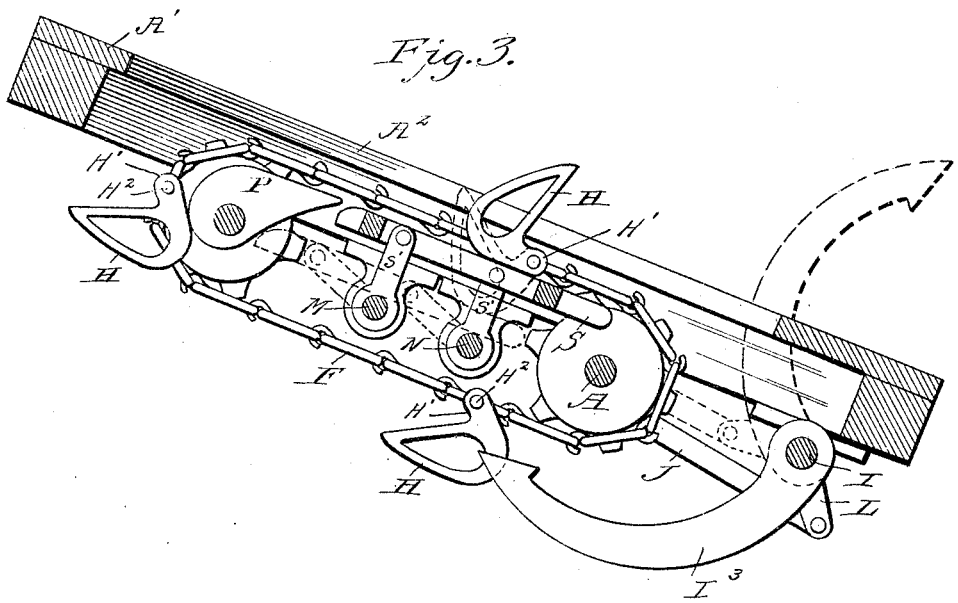
Figure 4:
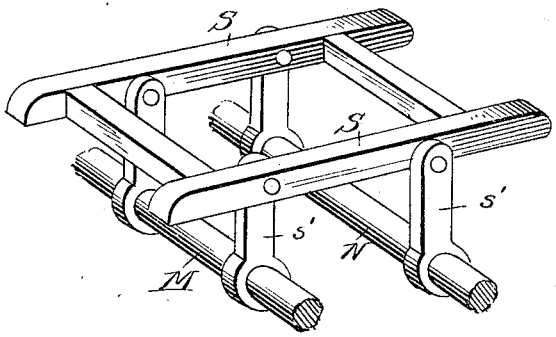

Figure 1 is a side elevation of the device, showing its relation to the deck and binding-needle of a harvester. Fig. 2 is a bottom plan view thereof. Fig. 3 is a central vertical longitudinal section through Fig. 2 and showing in dotted lines the parts retracted from working position, and Fig. 4 is a detail view of the supporting-frame.

Similar letters refer to similar parts throughout the several views.

Referring to the drawings, A' is the deck of a harvester, provided with parallel slots A² for the purpose hereinafter described. Journaled in brackets B', depending from the bottom of the deck near each end of the slots A², are short shafts A and a shaft B. Upon each short shaft is secured a sprocket G, and upon the shaft B are mounted two sprockets G, as shown. Chains F are mounted on these sprockets, and to one side of each chain is pivoted a series of packer-fingers H, adapted to project through the slots A², before referred to. These fingers are each provided with a straight front edge and a curved rear and bottom edge, ears H' being formed on their front edges and provided with apertures for the reception of pivot-pins H². One of the short shafts A is provided with a second sprocket E, upon which is mounted a chain R, adapted to receive motion from a sprocket C, mounted on a shaft D, adapted to be driven by the main harvester-chain.

A shaft I is journaled in depending brackets I' at one end of a slot I², formed in the lower portion of deck A', and a needle I³ is secured thereon and adapted to swing upward through the slot, as shown in dotted lines in Fig. 3.

Arranged under the upper ends of the slots A² and in alinement with the sprockets G on shaft B are fixed cam-shaped guides or frames P, and lying normally in horizontal alinement with these frames is a supporting-frame S. This frame is pivotally secured on arms S', extending from parallel shafts N and M. A crank K is arranged at one end of shaft M and is connected, by means of a pitman J, with a crank L, formed at one end of the needle-shaft I.

Motion is imparted to the chains F from shaft D through the chain R, as is obvious. As these chains travel the curved bottoms of the fingers H will be gradually and successively projected through the slots A² by the stationary cam-shaped frames P and will ride thereon and on the frame S in upright positions. When the needle swings upward, motion will be imparted, through pitman J, to the shafts M and N, and they will be rocked so as to swing the arms S' downward. The frame S will be carried thereby, and as the packer-fingers H are connected to their chains through their ears H' they will swing downward out of operative position (see dotted lines, Fig. 3) until the frame S is raised, when the needle moves downward.

What we claim as our invention, and desire to secure by Letters Patent, is—

In a grain-packer for harvesting-machines, the combination with the binder-deck having longitudinal slots therein, rotating shafts mounted in the stubbleward and grainward portions of the deck below the slots, sprocket-wheels on said shafts having chains thereon, and oppositely-arranged packer-fingers pivoted on said chains, cam-shaped guides secured on the grainward shaft coacting with the fingers to project the same upwardly through the slots, of shafts carrying a pivoted endwise-movable frame for supporting the fingers during their movement along the slots, a shaft at the stubbleward end of the frame, a binder-needle thereon, a crank-arm on said shaft, a crank-arm on one of the shafts of the endwise-movable frame, and a pitman connected to said crank-arms whereby the supporting-frame is adapted to be swung downward during the motion of the needle-shaft thereby withdrawing the fingers from operative position, substantially as specified.

DANIEL H. THURSTON.
JOHN F. HOLDEN.

Witnesses:
JOHN CLIGGITT,
B. C. KEELER.